Oct. 1, 1963   O. A. LOUGHRIDGE   3,105,528
POWER SAW MITER BOX ASSEMBLY
Filed May 29, 1962   2 Sheets-Sheet 1

INVENTOR.
OTIS A. LOUGHRIDGE,
BY
McMorrow, Berman & Davidson
ATTORNEYS.

INVENTOR.
OTIS A. LOUGHRIDGE,
BY
McMorrow, Berman & Davidson
ATTORNEYS.

United States Patent Office 3,105,528
Patented Oct. 1, 1963

3,105,528
POWER SAW MITER BOX ASSEMBLY
Otis A. Loughridge, Rte. 3, Box 77, Robeline, La.
Filed May 29, 1962, Ser. No. 198,548
12 Claims. (Cl. 143—6)

This invention relates to a novel power saw miter box assembly.

The primary object of the invention is the provision of a simple, practical, efficient, and low cost assembly of the kind indicated, which involves a base, adapted to be secured upon a support a fence-equipped relatively stationary saw table which is rotatable 90° from a centered square cut position in either direction, for miter sawing, and a vertically swingable power saw supporting arm which is slidably mounted on the base for forward and rearward movements relative to the saw table, for sawing short or long cuts in material laid upon the saw table, and for making cuts of various depths.

Other important objects and advantageous features of the invention will be apparent from the following description and the accompanying drawings, wherein, for purposes of illustration only, a specific form of the invention is set forth in detail.

Figure 1:
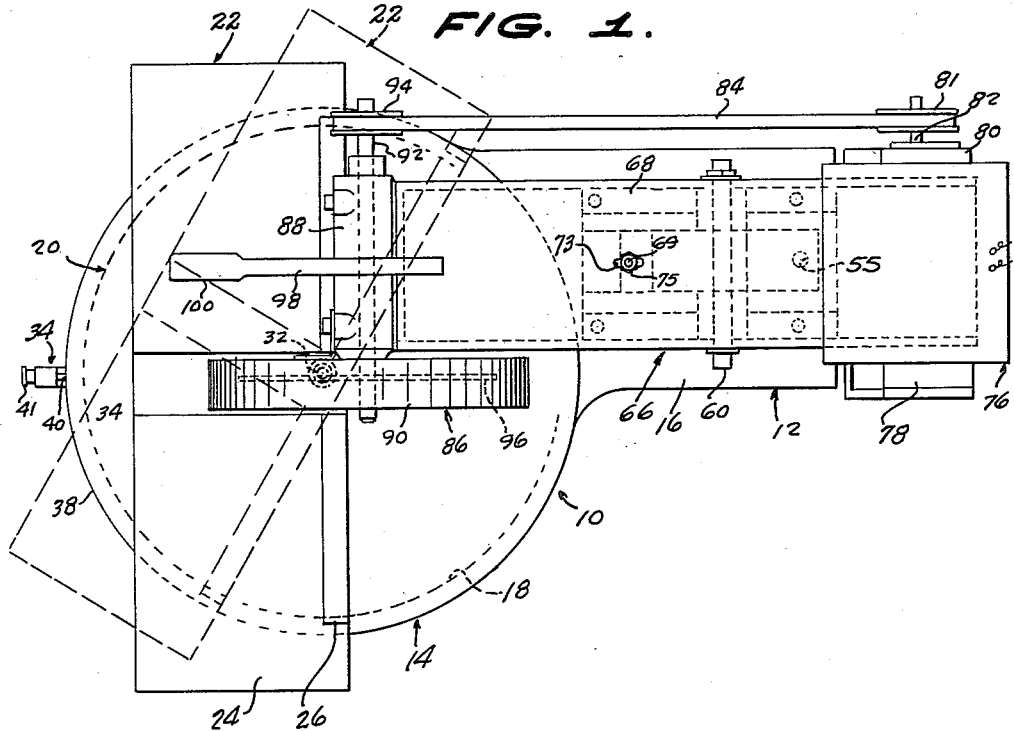
FIGURE 1 is a top plan view of an assembly of the present invention, showing the saw table in different positions, in full and in phantom lines.
Figure 2:
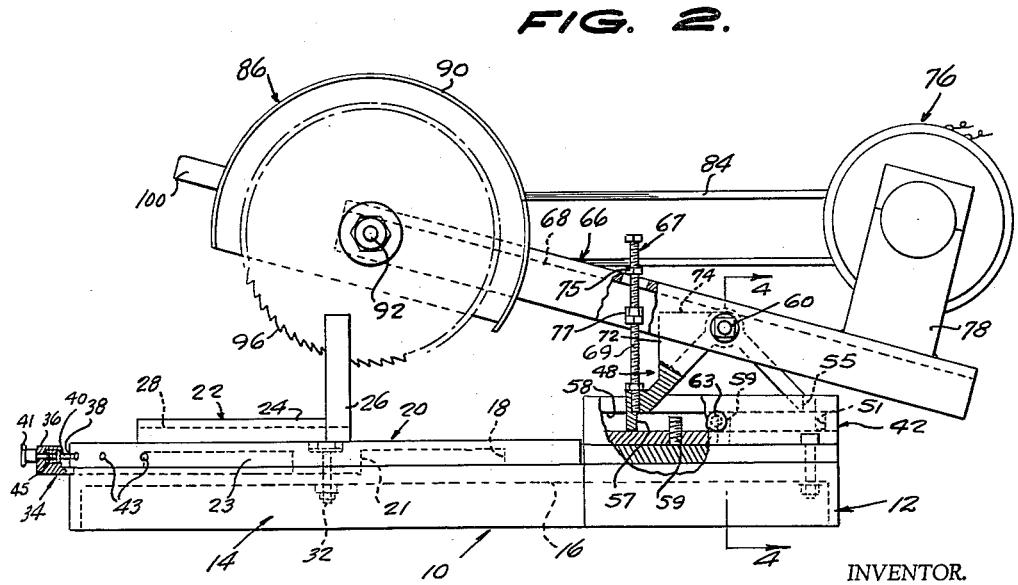
FIGURE 2 is a left-hand side elevation of said assembly partly broken away and in section.

Referring in detail to the drawings, wherein like numerals designate like parts throughout the several views, the illustrated assembly comprises a horizontally elongated base 10, preferably inverted pan form, composed of a relatively narrow, parallel sided rear portion 12, and a substantially wider substantially three-quarter circular forward portion 14. As shown in FIGURE 1, the circular forward portion 14 is offset to one side of the rear base portion 12, as to the left-hand side thereof. The rear portion 12 and the forward portion 14 preferably have, in common, a coplanar top wall 16. The upper surface of the top wall 16 is formed with a three-quarter circular recess 18, which is centered relative to the circular forward base portion 14, in which is seated and suitably fixed a three-quarter circular bearing plate 20, upon which a saw table, generally designated 22, bears. The bearing plate 20 has a central pendent hub 21 which bears upon the bottom of the recess 18, and a semi-annulus 23, concentric therewith, which also bears upon the bottom of the recess.

Figure 3:
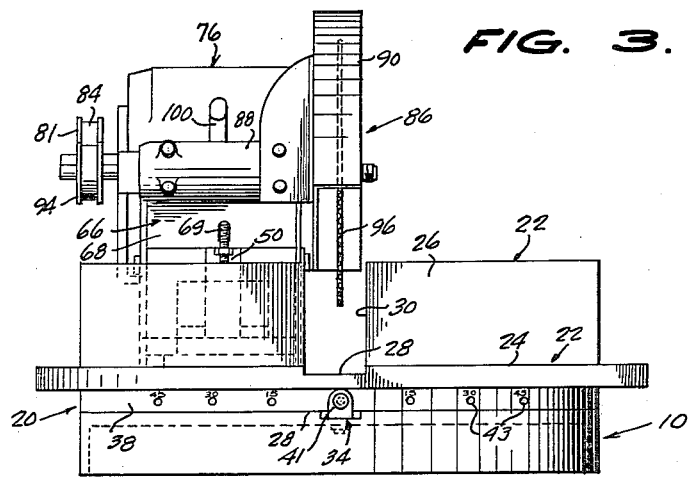
FIGURE 3 is a front end elevation of the assembly.

As shown in FIGURES 1 and 3, the saw table 22 comprises a horizontal, transversely elongated flat plate 24 of relatively great thickness, along whose rear edge is fixed an upstanding fence 26. The top of the plate 24 is provided, at its midlength point, with a right-angular saw blade clearance groove 28, which is aligned with a vertical saw blade slot 30, formed in the fence 26, and preferably of the same width as the groove 28, and which opens through the upper edge of the fence. A pivot bolt 32 extends through the saw table plate 24, at a point midway between its ends, and in the region of the fence 26, and through the plate 20 and the base top wall 16, at the center of the recess 18 in the circular forward portion 14 of the base 10, whereby the saw table 22 can be rotated 90° to either side of the longitudinal centerline of the base 10. It is to be noted that the slot 30 is collinear with the pivot bolt 32 or axis of rotation of the saw table 22.

A reclining L-shaped bracket 34 is fixed to and extends forwardly from the forward edge of the forward base portion 14, and has an upstanding arm 36, spaced from the portion 14 and plate 20, through which slides a pin 40 having an enlarged knob 41, on its outer end, the inner end of the pin being adapted to be selectively engaged in any one of a series of spaced sockets 43 provided in the peripheral edge 33 of the bearing plate 20, for holding the saw table 22 in selected angular adjusted positions. A coil spring 45 is circumposed on the pin 40 and is compressed between the arms 36 and a collar 47 on the pin, and urges the pin toward the bearing plate.

Figure 4:
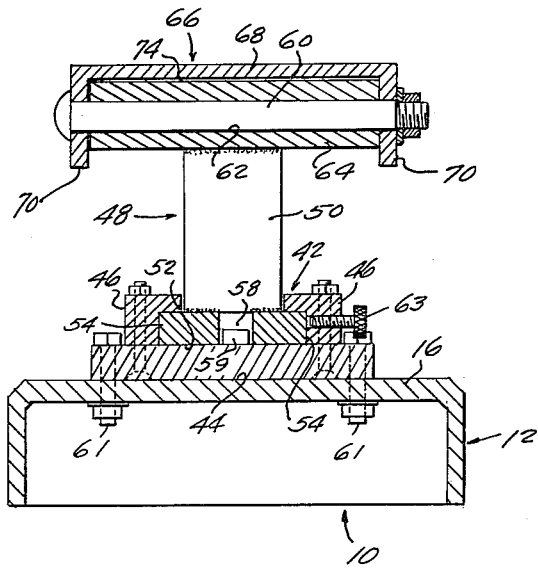
FIGURE 4 is an enlarged vertical transverse section taken on the line 4—4 of FIGURE 2.

A horizontal slideway 42 is fixed upon the relatively narrow rear portion 12 of the base 10, adjacent to the rear end thereof, and extends somewhat beyond the forward end of the rear portion 12, onto the circular forward portion 14. The slideway 42 comprises a longitudinally elongated base plate 44, which is, as shown in FIGURES 1 and 4, susbtantially narrower than and equally spaced from the sides of the rear base portion 12. Facing longitudinal hook-flanges 46, equally spaced from the side edges of the base plate 44, extend the length of the base plate 44.

A T-shaped slide 48, somewhat shorter than the slideway 42 is engaged in the slideway between the flanges 46, for forward and rear sliding movements therein, as shown in FIGURE 4, which comprises a standard 50, which has a flat bottom surface 52 which bears upon the slideway base plate 44, between the hook-flanges 46, and lateral ribs 54, which comformably engage in the apertures of the hook-flanges 46, with the sides of the standard 50 of the slide bar engaged with the inner edges of the hook-flanges. The bottom surface 52 of the slide 48 is provided with a centered longitudinal groove 58, having closed ends 57, which receive longitudinally spaced upstanding stop lugs 59 threaded in the slideway base plate 44. The lugs 59 are removable through holes 55 provided at the ends of the slide. The slideway base plate 44 is fixed in place upon the rear base portion 12, by means of bolts 61 extending therethrough and through the base top wall 16. A set screw 63 is threaded through a hook-flange 46 against a slide rib 54 for releasably holding the slide in desired positions.

A transverse horizontal pivot bolt 60 extends through a bore 62, provided in a cross head 64, on the upper end of the slide standard 50, which extends beyond opposite sides of the standard, and mounts a longitudinally elogated power saw suporting arm 66 on the slide 48, in swing in a vertical plane on an axis spaced above the base 10. The arm 66 is preferably in the form of an inverted channel, having a flat web 68 and and pendent side flanges 70, which are traversed by the pivot bolt 60, and bear against the edges of the cross head 64. The arm is limited to being swung forwardly and downwardly beyond parallelism with the base 10, by means of a stop portion 72 of the slide standard 50, on the forward end thereof, which has a flat horizontal upper surface 74, adapted to be engaged by the web 68. An adjustable stop 67 comprises a vertical screw 69 having a lower end threaded into the forward part of the standard 50 and having a nut 71 on its upper end. The screw 69 extends through a longitudinal slot 73, provided in the arm web 68, and has thereon an upper nut 75 and a lower nut 77, which are adjustable for engaging the upper and lower surfaces of the arm web 68.

A motor, such as an electric motor 76, is mounted upon arm web 68, at the rear end thereof, as by means of spaced brackets 78 and 80, and has, on its right-hand end, a pulley wheel 81, on the shaft 82 of the motor, over which a flexible endless belt 84 is trained, for driving a disc saw unit 86, which is fixedly mounted on the forward end of the arm 66.

The saw unit 86 comprises a transversely elongated cylindrical housing 88, which is suitably fixed to the forward end of the arm 66, and has, on its right-hand end, an enlarged diameter semi-circular, open-bottom saw guard 90. A shaft 92 is axially journaled through the housing 88, in the plane of the pivot bolt 60 of the arm 66, and has a pulley wheel 94, on its right-hand end, over which the belt 84 is trained. A disc saw blade 96 is fixed on the left-hand end of the shaft 92 and is enclosed in the guard 90. This positions the saw blade 96 between the sides of the saw blade clearance groove 28 and the saw blade slot 30 in the fence 26 of the saw table 22, and in the plane along which the axis of rotation of the saw table 22 lies.

A hand lever 98 is fixed upon the saw housing 88, extends forwardly therefrom, and has a hand grip 100, on its forward end, which is adapted to be grasped by the operator for swinging the saw unit upwardly and downwardly, and for moving the saw unit forwardly and rearwardly, relative to the saw table 22, for sawing wood or light weight metal pieces, laid upon the saw table against the fence 26, with the saw table rotatably adjusted and locked in a selected position. It is to be noted that with the saw arm 66 stopped in its horizontal position by the stop portion 72 of the standard 50 of the slide 48, the depth of cut of the saw blade 96 is determined by the diameter of the saw blade.

The relative weights of the saw unit 86 and the motor 76 can be selected so that they counterbalance each other or overbalance each other, toward either end of the arm 66.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, and a power saw unit mounted on the arm above the saw table.

2. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table, and first stop means on the slide for limiting swinging of the saw unit toward the saw table.

3. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table, and first stop means on the slide for limiting swinging of the saw unit toward the saw table, said arm being pivoted intermediate its ends on the slide, said power saw unit being mounted on the arm at the saw table side of the pivotal point of the arm, a motor mounted on the arm at the other side of the pivotal point, and means operatively connecting the motor to the saw unit.

4. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table and having a blade in the plane of which the axis of rotation of the saw table lies, and first stop means on the slide for limiting swinging of the saw unit toward the saw table, said saw table comprising a transversely elongated flat plate and an upstanding fence extending along the plate at the edge thereof adjacent to the slideway, the saw table plate being formed in its upper surface with a centered saw blade clearance groove and said fence having a saw blade slot aligned with the groove.

5. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table and having a blade in the plane of which the axis of rotation of the saw table lies, and first stop means on the slide for limiting swinging of the saw unit toward the saw table, said saw table comprising a transversely elongated flat plate and an upstanding fence extending along the plate at the edge thereof adjacent to the slideway, the saw table plate being formed in its upper surface with a centered saw blade clearance groove and said fence having a saw blade slot aligned with the groove, said saw table being mounted on the base on an axis located at one side of the said arm, the saw unit having a blade positioned in the slot of the fence.

6. A power saw miter box assembly comprising a base, a saw table rotatably mounted on the base, a horizontally slideway on the base at one side of the saw table, a slide working in the slideway toward and away from the saw table, an arm pivoted on the slide to swing in a vertical plane toward and away from the saw table a power saw unit mounted on the arm abve the saw table and having a blade in the plane of which the axis of rotation of the saw table lies, and first stop means on the slide for limiting swinging of the saw unit toward the saw table, said saw table comprising a transversely elongated flat plate and an upstanding fence extending along the plate at the edge thereof adjacent to the slideway, the saw table plate being formed in its upper surface with a centered saw blade clearance groove and said fence having a saw blade slot aligned with the groove, said base having a rotary bearing plate journaled thereon, upon which the saw table is fixed, and a locking pin on the base engageable with the edge of the bearing plate for holding the saw table in selected rotated positions.

7. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table and having a blade in the plane of which the axis of rotation of the saw table lies, and first stop means on the slide for limiting swinging of the saw unit toward the saw table, said saw table comprising a transversely elongated flat plate and an upstanding fence extending along the plate at the edge thereof adjacent to the slideway, the saw table plate being formed in its upper surface with a centered saw blade clearance groove and said fence having a saw blade slot aligned with the groove, said base having a bearing plate journaled thereon upon which the saw table is fixed, said bearing plate having a circular peripheral edge concentric with the pivotal point of the saw table, a bracket on the base having an arm spaced from said peripheral edge, and a spring-pressed locking pin sliding in the arm and adapted to engage with said peripheral edge for locking the saw table in selected rotated positions, said peripheral edge having spaced sockets in which the pin is selectively engaged.

8. A power saw miter box assembly comprising an elongated horizontal base having a relatively narrow parallel sided rear portion and a relatively larger diameter circular forward portion, said circular forward portion being offset to one side of the rear portion, a rotatable saw table pivoted axially upon said circular portion, said saw table comprising a transversely elongated flat plate having an upstanding fence along its rear edge having a vertical saw blade slot collinear with the saw table axis of rotation, a horizontal slideway fixed upon said rear base portion, a slide engaged in the slideway for movement toward and away from the saw table, a longitudinal arm pivoted for swinging in a vertical plane on the slide above the slideway, a power saw unit mounted on the arm forwardly of the pivotal point of the arm, said unit having a disc blade positioned at one side of the arm to engage in the saw blade slot of the fence.

9. A power saw miter box assembly comprising an elongated horizontal base having a relatively narrow parallel sided rear portion and a relatively large diameter circular forward portion, said circular forward portion being offset to one side of the rear portion, a rotatable saw table pivoted axially upon said circular portion, said saw table comprising a transversely elongated flat plate having an upstanding fence along its rear edge having a vertical saw blade slot collinear with the saw table axis of rotation, a horizontal slideway fixed upon said rear base portion, a slide engaged in the slideway for movement toward and away from the saw table, a longitudinal arm pivoted for swinging in a vertical plane on the slide above the slideway, a power saw unit mounted on the arm forwardly of the pivotal point of the arm, said unit having a disc blade positioned at one side of the arm to engage in the saw blade slot of the fence, said arm being pivoted intermediate its ends on the slide, said saw unit being mounted on the arm forwardly of the pivotal point of the arm, a motor mounted on the arm rearwardly of the pivotal point of the arm, and means operatively connecting the motor to the saw unit.

10. A power saw miter box assembly comprising an elongated horizontal base having a relatively narrow parallel sided rear portion and a relatively large diameter circular forward portion, said circular forward portion being offset to one side of the rear portion, a rotatable saw table pivoted axially upon said circular portion, said saw table comprising a transversely elongated flat plate having an upstanding fence along its rear edge having a vertical saw blade slot collinear with the saw table axis of roation, a horizontal slideway fixed upon said rear base portion, a slide engaged in the slideway for movement toward and away from the saw table, a longitudinal arm pivoted for swinging in a vertical plane on the slide above the slideway, a power saw unit mounted on the arm forwardly of the pivotal point of the arm, said saw unit having a disc blade positioned at one side of the arm to engage in the saw blade slot of the fence, and first stop means on the slide located forwardly of the pivotal point of the arm, for limiting forward and downward swinging of the arm and the saw unit relative to the saw table.

11. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table, and second adjustable stop means comprising a vertical screw upstanding on a part of the slide, said arm having a longitudinal slot through which the screw rises, said screw having thereon an upper stop nut and a lower stop nut adapted to be engaged by the upper and lower surfaces of the arm.

12. A power saw miter box assembly comprising a base, a saw table rotatably mounted on the base, a horizontal slideway on the base at one side of the saw table, a slide working in the slideway toward and away from the saw table, an arm pivoted on the slide to swing in a vertical plane toward and away from the saw table, a power saw unit mounted on the arm above the saw table, and second adjustable stop means upstanding on the slide and adapted to engage, at different times, the upper and lower surfaces of the arm, to limit the depth of cut of the saw unit and to limit upward swinging of the arm relative to the saw table.

References Cited in the file of this patent

UNITED STATES PATENTS

| | | |
|---|---|---|
| 1,276,092 | Mann | Aug. 20, 1918 |
| 1,462,764 | Nyquist et al. | July 24, 1923 |
| 1,481,569 | Tannewitz | Jan. 22, 1924 |
| 1,524,007 | Adair | Jan. 27, 1925 |
| 1,697,873 | Lambert | Jan. 8, 1929 |
| 2,371,401 | Martin | Mar. 13, 1945 |
| 2,372,699 | Wiken et al. | Apr. 3, 1945 |
| 2,559,283 | Dick | July 3, 1951 |
| 2,851,068 | Goodlet | Sept. 9, 1958 |

FOREIGN PATENTS

| | | |
|---|---|---|
| 591,212 | Great Britain | Aug. 11, 1947 |